United States Patent [19]

Meehan et al.

[11] Patent Number: 5,798,788
[45] Date of Patent: Aug. 25, 1998

[54] METHOD AND APPARATUS FOR EVALUATING FIELD DISPLAY FUNCTIONALITY OF A VIDEO DECODER

[75] Inventors: Paul Harquail Meehan; Michael Anthony Isnardi, both of Plainsboro; Charles Benjamin Dieterich, Kingston, all of N.J.

[73] Assignee: David Sarnoff Research Center, Inc., Princeton, N.J.

[21] Appl. No.: 595,147

[22] Filed: Feb. 1, 1996

[51] Int. Cl.⁶ ................................................ H04N 17/00
[52] U.S. Cl. ........................................ 348/180; 348/189
[58] Field of Search ................................ 348/180, 189, 348/191, 558, 526, 845.1; H04N 17/00

[56] References Cited

U.S. PATENT DOCUMENTS

| | | | |
|---|---|---|---|
| 5,051,827 | 9/1991 | Fairhurst | 348/180 |
| 5,313,280 | 5/1994 | Straus | 348/189 |
| 5,499,050 | 3/1996 | Baldes et al. | 348/180 |
| 5,565,998 | 10/1996 | Coombs et al. | 348/96 |
| 5,602,586 | 2/1997 | Schauer et al. | 348/180 |

*Primary Examiner*—Victor R. Kostak
*Attorney, Agent, or Firm*—William J. Burke

[57] ABSTRACT

A method and apparatus for creating and using an encoded bitstream to evaluate a video decoder. The bitstream contains a sequence of pictures or frames such that when a video decoder decodes the bitstream correctly, a desired visible pattern is produced on a video display. Specifically, various display parameters or flags are varied in the bitstream to test the video decoder's ability to implement display features such as "3:2 pulldown". For example, the bitstream is capable of demonstrating incorrect decoding of the top__field__first and repeat__first__field flags by a MPEG compliant video decoder.

22 Claims, 9 Drawing Sheets

METHOD AND APPARATUS FOR EVALUATING FIELD DISPLAY FUNCTIONALITY OF A VIDEO DECODER

The present invention relates to a method and apparatus for evaluating the decoding of video signals. More particularly, this invention relates to a "non-invasive" method and apparatus that evaluates the field display functionality of a "black box" video decoder by observing the response of the decoder to a predefined series of input signals.

BACKGROUND OF THE INVENTION

The increasing development of digital video/audio technology presents an ever increasing problem of resolving the inter-operability of equipment of different manufacturers. To achieve these goals, the Moving Picture Experts Group (MPEG) created the ISO/IEC international Standards 13818-1 (1994) (generally referred to as MPEG-1), 11172-3 (1991) (generally referred to as MPEG-1 Audio) and 13818-2 (Jan. 20, 1995 draft) (generally referred to as MPEG-2), which are incorporated herein in their entirety by reference. One goal of these standards is to establish a standard coding/decoding strategy with sufficient flexibility to accommodate a plurality of different applications and services such as desktop video publishing, video conferencing, digital storage media and television broadcast.

Although the MPEG standards specify a general coding methodology and syntax for generating a MPEG compliant bitstream, many variations are permitted in the values assigned to many of the parameters, thereby supporting a broad range of applications and interoperability. In effect, MPEG does not define a specific algorithm needed to produce a valid bitstream. Furthermore, MPEG encoder designers are accorded great flexibility in developing and implementing their own MPEG-specific algorithms. This flexibility fosters development and implementation of different MPEG-specific algorithms, thereby resulting in product differentiation in the marketplace. Thus, a need exists for a method and apparatus for evaluating the compliance and quality of MPEG-like decoders.

Digital television decoders (such as MPEG decoders) present a difficult testing problem when compared to analog television systems. An analog system has minimal or no memory and is generally linear, such that the system's behavior is instantaneous. Thus, the behavior of an analog system can be extrapolated from one signal range to another.

In contrast, digital decoders are highly non-linear and often contain memory. A digital decoder may operate normally over a certain range of a certain parameter, but may fail dramatically for certain other values. In essence, the behavior of a digital decoder cannot be extrapolated from one signal range to another. Furthermore, a digital decoder may depend on previously decoded data for proper behavior.

Generally, the testing of complex digital systems such as decoders is performed by stimulating the decoder under test with a known sequence of data, and then analyzing the output data sequences or the intermediate data sequences using, e.g., a logic analyzer, to determine if the results conform to expectations. Although this is an effective testing technique, it requires extensive knowledge of the circuit implementation or observation of internal nodes of the particular decoder.

However, in many instances the decoder is a "black-box" that accepts a bitstream (encoded signal) as input and provides a digital or analog representation of the decoded signal as an output. Due to product differentiation in the marketplace, it may not be possible to acquire such technical information for all decoders. In fact, even if such technical information is available, it may not be cost effective to construct a different test sequence for every decoder.

More specifically, some MPEG-like decoders support the important feature of "3:2 pull down", which is a feature for representing 24 frames-per-second (fps) motion picture film (movie) as 30 fps video. Each encoded movie picture can independently specify whether it is displayed for two or three video field periods. Thus, irregular 3:2 pull down source material can be transmitted as progressive frames at a lower frame rate than the source. The performance of a decoder in supporting this feature depends on its ability to properly decode and apply two flags or parameters called "top_field_first" and "repeat_first_field". If these two flags are misinterpreted by a decoder, the resulting image suffers a slight degradation, but it will appear generally correct. However, the quality of the resulting image will not be as good as it was intended. The cause of such degradation is difficult to isolate and increases the complexity of determining whether the decoder is operating properly.

Therefore, a need exists in the art for a method and apparatus for testing MPEG-like decoders without prior knowledge of the particular circuit implementation of any particular decoder. Specifically, a need exists for a method and apparatus for creating a test sequence or bitstream that will produce visually detectable errors in the image produced by a video decoder if the decoder does not properly decode the bitstream.

SUMMARY OF THE INVENTION

The present invention is a method and apparatus for creating and using an encoded bitstream to evaluate a video decoder. The bitstream contains a sequence of pictures or frames such that when a video decoder decodes the bitstream correctly, a desired visible pattern is produced on a video display. Since the video output images of the input image sequence is predictable, the bitstream provides a set of fast and effective tests for evaluating black box video decoders which may have no accessible internal nodes.

Specifically, various display parameters or flags are varied in the bitstream to test the video decoder's ability to implement display features such as "3:2 pulldown". For example, the bitstream is capable of demonstrating incorrect decoding of the top_field_first and repeat_first_field flags by a MPEG compliant video decoder.

The method of fabricating the test bitstream requires the selection of a sequence of pictures or frames. The lines on the fields of each frame are selected to produce a desired output image. The lines can be dark, bright or a combination of both dark and bright. The bitstream is fabricated when each frame is then encoded with a different combination of the top_field_first and repeat_first_field values. These flags control the display order of the top and bottom fields of a frame including the decision as to which field to repeat. If a video decoder properly decodes these flags, a visually detectable output image is produced. Furthermore, the vbv_delay parameter in the bitstream is selected to accommodate the change in display rate.

The method of evaluating a video decoder sends the bitstream to the decoder while repeating the encoded frames in the bitstream for a predefined period of time. The decoder should produce two distinctive regions with differing level of brightness in the output image. The patterns of the two regions will indicate the performance of the video decoder.

3

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In order to devise a test bitstream and a test method for evaluating a video decoder, it is necessary to evaluate the steps of the video encoding and decoding processes.

Figure 1:
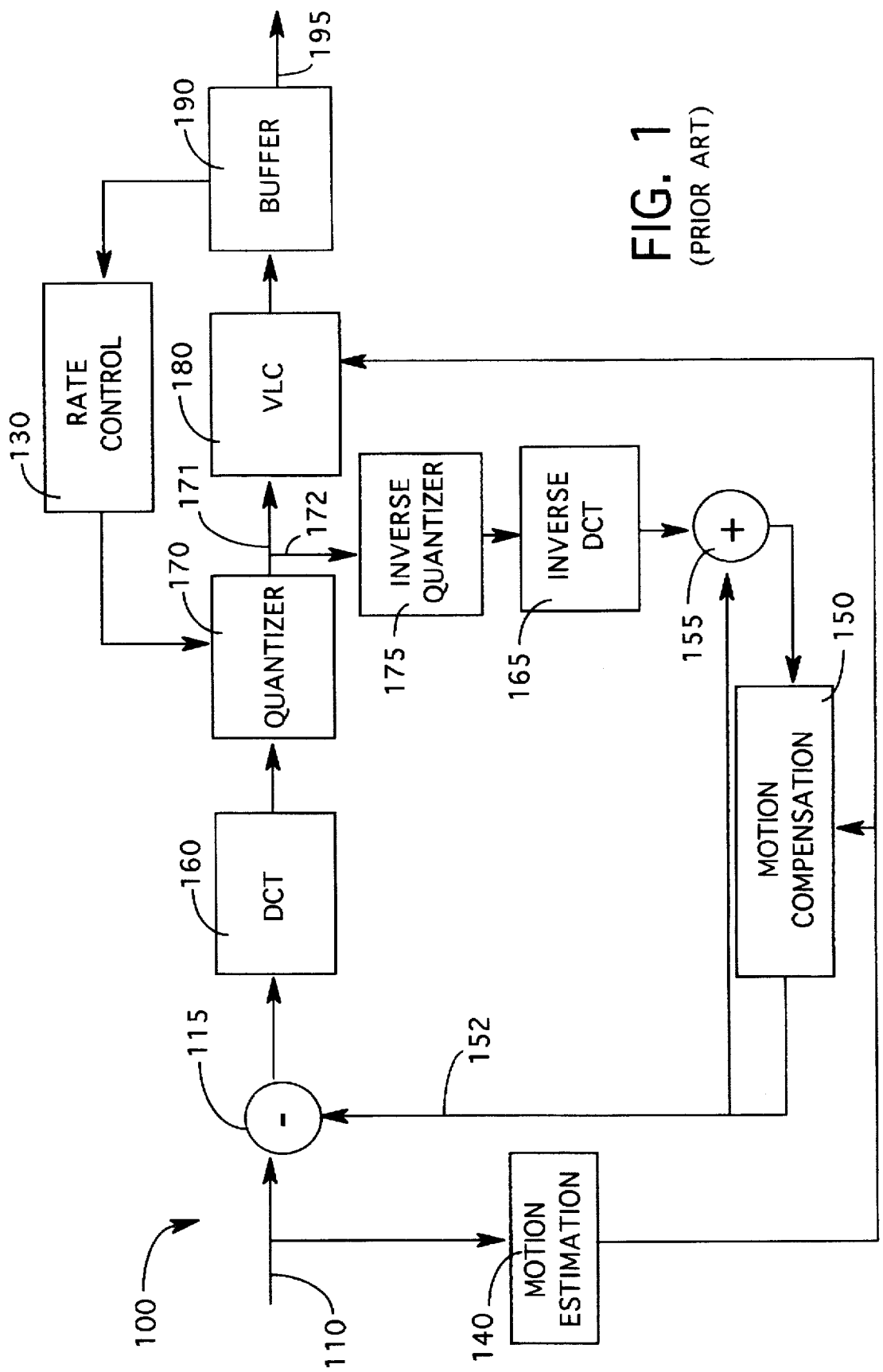
FIG. 1 illustrates a block diagram of the basic structure of a conventional video encoder.

FIG. 1 depicts a block diagram of a simplified structure of a video encoder 100 for encoding an input video image (image sequence) 110 to produce a bitstream 195. Once the encoder has decided which picture type (I, P, or B) to use for each picture, motion estimation section 140 and motion compensation section 150 are used to construct a motion compensated prediction (predicted image) 152. This predicted image is subtracted via subtractor 115 from the input video image 110 in the current macroblocks to form an error signal (e) or predictive residual.

The predictive residual for each macroblock is then transformed and quantized by the Discrete Cosine Transform (DCT) section 160 and the quantizer section 170 respectively. The resulting 8×8 block of quantized DCT coefficients is received by variable length coding (VLC) section 180 via signal connection 171. The VLC section 180 encodes the string of quantized DCT coefficients and all side-information by utilizing variable length coding and run-length coding.

A consequence of using different picture types and variable length coding is that the overall bit rate is variable. Thus, a buffer 190 and a rate control section 130 are provided to prevent overflow and underflow conditions on the decoder side. At regular intervals determined by the picture rate, the decoder shown in FIG. 2 instantaneously removes all the bits for the next picture from its input buffer. If there are too few bits or too many bits in the input buffer, an error condition may result. Thus, it is the task of the rate control section 130 to monitor the status of buffer 190 to control the number of bits generated by the encoder, thereby preventing the overflow and underflow conditions.

Finally, the resulting 8×8 block of quantized DCT coefficients is dequantized and transformed by the quantizer section 170 and the inverse DCT section 165 respectively to produce the decoded error signal. This error signal is added back to the prediction signal from the motion compensation section via summer 155 to produce a decoded reference picture.

Figure 2:
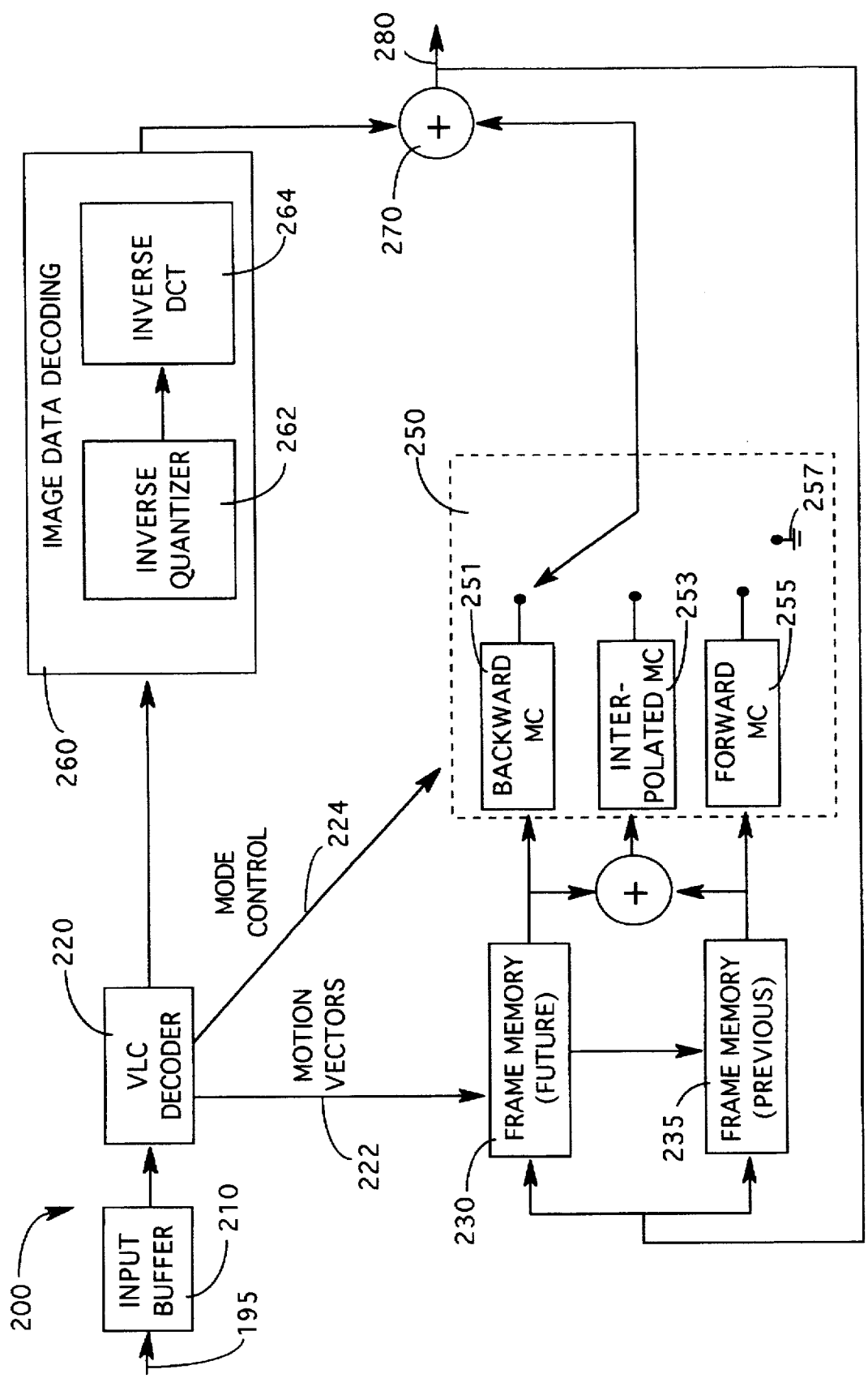
FIG. 2 illustrates a block diagram of the basic structure of a conventional video decoder.

FIG. 2 depicts a block diagram of a simplified structure of a video decoder 200 for receiving the encoded video bitstream 195. The video decoder 200 comprises an input buffer 210, a variable length code (VLC) decoder section 220, an image data decoding section 260, frame memory sections 230 and 235 and a mode control section 250. The video decoder accepts the encoded video bitstream 195 and decodes the various data elements which are used to produce a decoded video output 280.

Specifically, the encoded video bitstream is received and accumulated into the input buffer 210 until it is needed. The VLC decoder section 220 decodes the picture type and all other information via a plurality of variable length code tables which are disclosed in ISO/IEC international Standards 13818-2. The mode control information 224 are forwarded to the mode control section 250 which comprises a backward motion compensation (MC) section 251, an interpolated MC section 253, a forward MC section 255 and an intra coding section 257. The proper selection of a particular motion compensation or intra coding section depends upon the picture type of a decoded picture.

For each block, the VLC decoder section 220 also decodes the motion vectors 222, if any, giving the displacement from the stored previous and/or future pictures. The previous and future reference pictures are stored in the previous frame memory section 235 and future frame memory section 230 respectively. The motion vectors 222 are used in conjunction with the mode control section 250 to produce a predicted block.

The VLC decoder section also decodes the quantized coefficients corresponding to the quantized coefficients of the predictive residual or difference block. The decoded quantized coefficients are forwarded to image data decoding section 260, where the inverse quantization and inverse discrete cosine transform are applied to the quantized coefficients by an inverse quantizer section 262 and an inverse DCT section 264 respectively. The quantized coefficients are converted into pixel values which are added to a predicted block, if any, to produce the decoded picture 280.

Furthermore, the VLC decoder section 220 also decodes important header information which may contain a plurality of video syntax or extensions such as the "Picture Coding Extension". This extension and others are defined in ISO/IEC international Standards 13818-2. Each extension may contain "flags" which are generally one bit integer variable that provides information about the coded data. Such information may affect the construction, display, timing and order of the pixel values and predicted blocks which are generated by other sections of a video decoder. A decoder under test may actually decode the motion vectors and the encoded data correctly, but fails in properly decoding and applying the various display or timing parameters. Thus, it is necessary to construct a set of test methods to evaluate a video decoder's ability to decode and apply these parameters.

Figure 3:
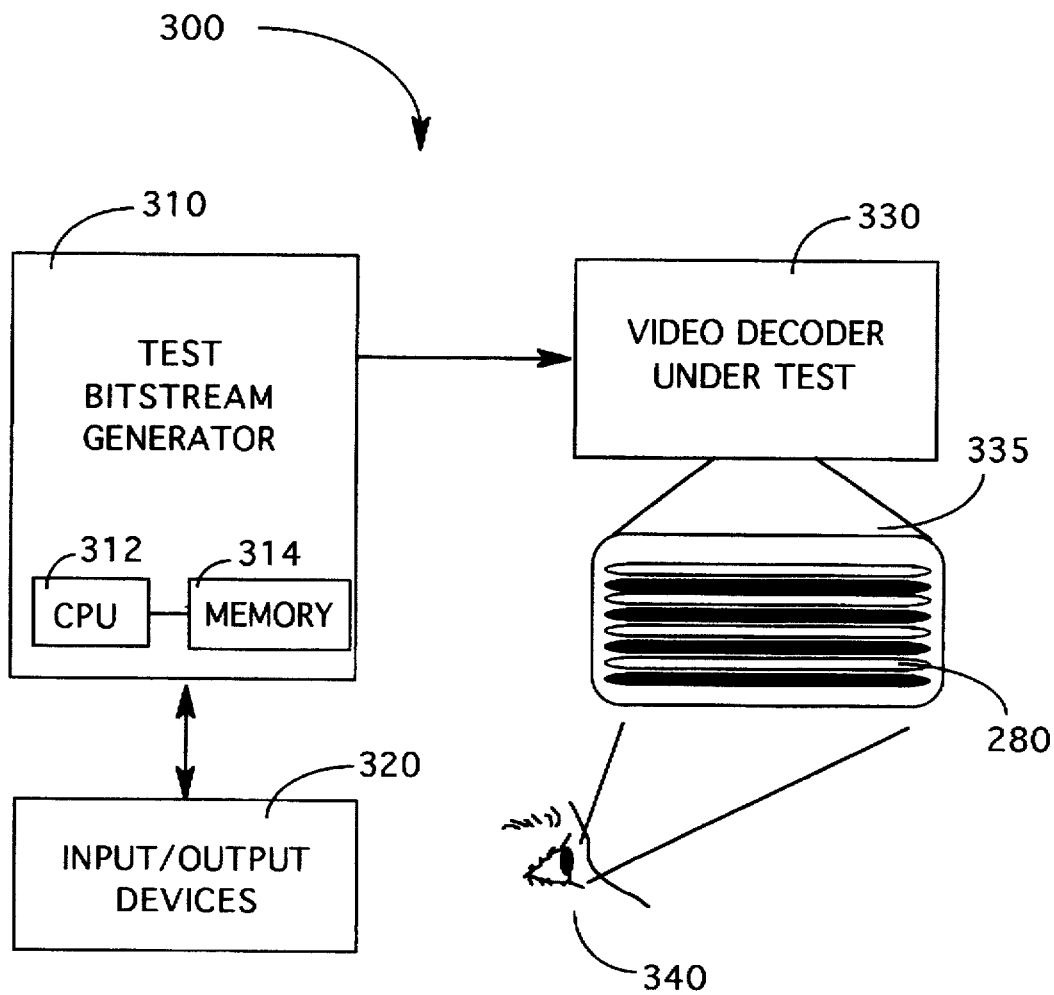
FIG. 3 illustrates a test apparatus of the present invention.

FIG. 3 illustrates a test apparatus 300 of the present invention. The test apparatus comprises a test bitstream generator 310 and an evaluation tool 340. In the preferred embodiment, the test bitstream generator comprises a general purpose computer having a central processing unit (CPU) 312 and a memory 314 for generating a plurality of encoded video bitstreams for evaluating a video decoder under test 330. The video decoder under test can be a physical video decoder device which is coupled to the test bitstream generator through a communication system such as a transmission channel. Alternatively, the video decoder under test can be represented by an algorithm residing in the memory of the test bitstream generator.

The test bitstream generator 310 is coupled to a plurality of input and output devices 320 such as a keyboard, a mouse, a camera, a camcorder, a video monitor or storage devices including but not limited to a hard disk drive or a compact disk drive. The input devices serve to provide inputs to the test bitstream generator for producing the encoded video bitstreams or to retrieve the encoded video bitstreams from a storage device (not shown). Typically, a specific sequence of images are encoded by the test bitstream generator to produce the test bitstream. The test bitstream is then stored in a storage device for subsequent use in testing a video decoder.

The operator of the test apparatus sends an encoded video bitstream to video decoder 330 which, in turn, generates a video output 280. The video output is displayed on a video monitor 335, which can be a separate display device or one of the output devices used by the test bitstream generator. Depending upon the test, the video output may comprise a plurality of different visual signs or signals such as a picture having a uniform shading or a picture having regions with different brightness in various patterns such as a side by side pattern, a top or bottom pattern or an alternating pattern.

The visual signs are easily detected and are received by the evaluation tool 340 to gauge the performance of the video decoder under test. In the preferred embodiment, the evaluation tool is simply a viewer. Alternatively, the evaluation tool is directly coupled to the video decoder under test and may include an oscilloscope, various meters, a logic analyzer or equipment capable of discerning relative brightness of regions on the video monitor.

Figure 4:
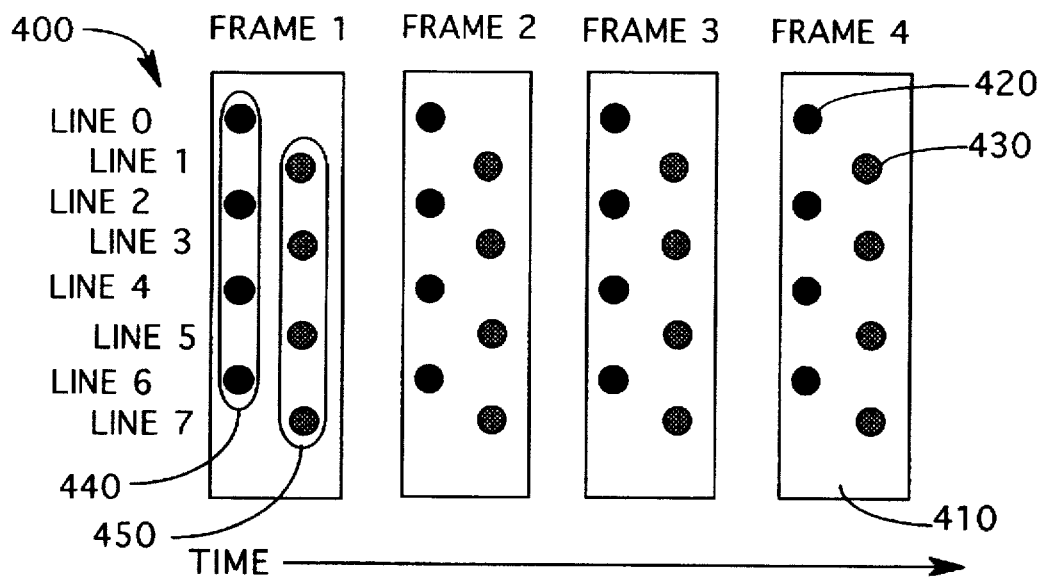
FIG. 4 illustrates a conventional display method for an interlaced video output.

FIG. 4 illustrates a conventional display method 400 for an interlaced video output. The display method shows a plurality of frames 410 where they are displayed sequentially over time starting from frame 1 to frame 4. Although only four frames are illustrated, a video output sequence may comprise any number of frames. Each frame generally comprises two fields, a top field 440 and a bottom field 450. Each line 420 of a top field is spatially located immediately above the corresponding line 430 of a bottom field. Thus, the even numbered lines 0, 2, 4 and 6 comprise the top field while the odd numbered lines 1, 3, 5 and 7 comprise the bottom field. Again, the frame size is not limited to eight lines and may be as large as approximately $2^{14}$ samples wide by $2^{14}$ lines high.

The top field of each frame is generally displayed first followed by the bottom field. Thus, line 0 of each frame is displayed first at the highest vertical displacement until all the even lines are displayed. Subsequently, the odd numbered lines are displayed starting with a slightly lower vertical displacement.

Figure 5:
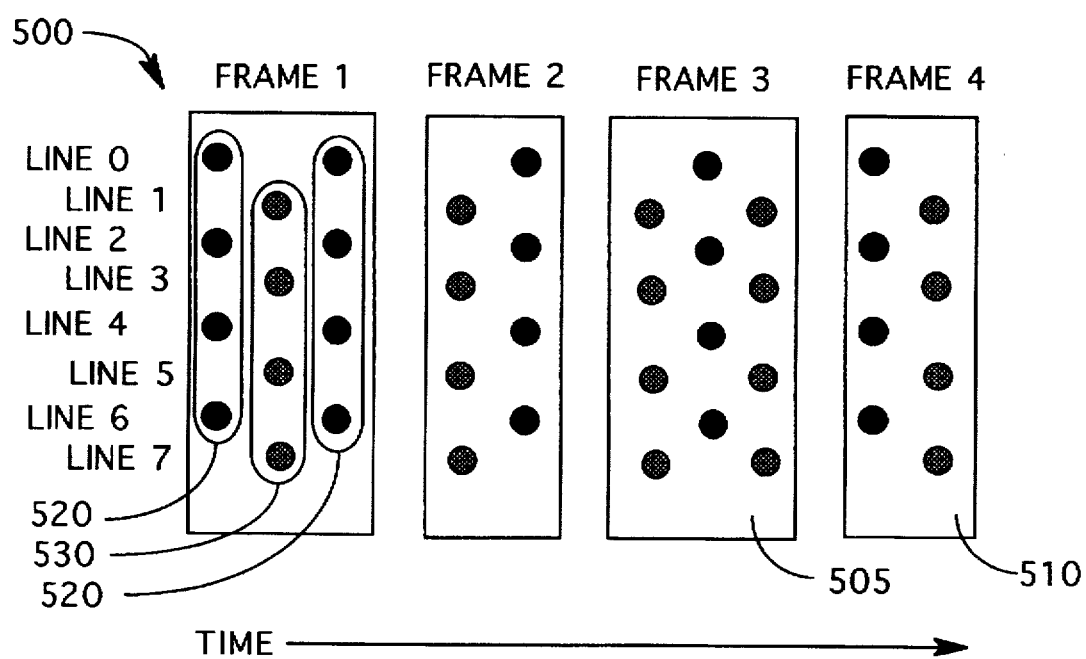
FIG. 5 illustrates a display method for adjusting the display process to match the display frame rate of an encoded sequence to that of a display device.

FIG. 5 illustrates another display method 500 for an interlaced video output. Method 500 illustrates one method of adjusting the display process to match the display frame rate of an encoded sequence to that of a display device. One example is "3:2 pull down", which is a feature for representing 24 fps motion picture film as 30 fps video. Since the frame display of a movie is 24 frame per second, the display process must be altered to display the movie on a video display device that generally shows 60 interlaced fields per second. Method 500 adjusts the display process by selectively repeating fields of various frame 505 while leaving other frames 510 unaltered.

To illustrate, frames 1 and 3 contain a top field 520 and a bottom field 530. In order to match the frame rate of the encoded bitstream and the display device, the first occurring field of frames 1 and 3 is repeated before the next frame (2 and 4) is displayed. This process is generally known as "repeat first field". In this fashion, 60 interlaced fields are displayed in one second for a sequence of 24 frames of images.

The parameters that control the video decoder in altering this aspect of the display process is encoded into the bitstream by the encoder. The parameters are two flags called "repeat_first_field" (rff) and "top_field_first" (tff). The meaning of these flags depend upon the settings of other flags as defined by the MPEG standards. When "progressive-sequence" is equal to "0" and progressive_frame" is equal to "1", the meaning of "repeat first_field" and "top_field_first" is defined in Table 1.

TABLE 1

| rff = 0 & tff = 1 | rff = 0 & tff = 0 | rff = 1 & tff = 1 | rff = 1 & tff = 0 |
| --- | --- | --- | --- |
| top field is first field & no repeat of first field | bottom field is first field & no repeat of first field | top field is first field & repeat first field | bottom field is first field & repeat first field |

Figure 6:
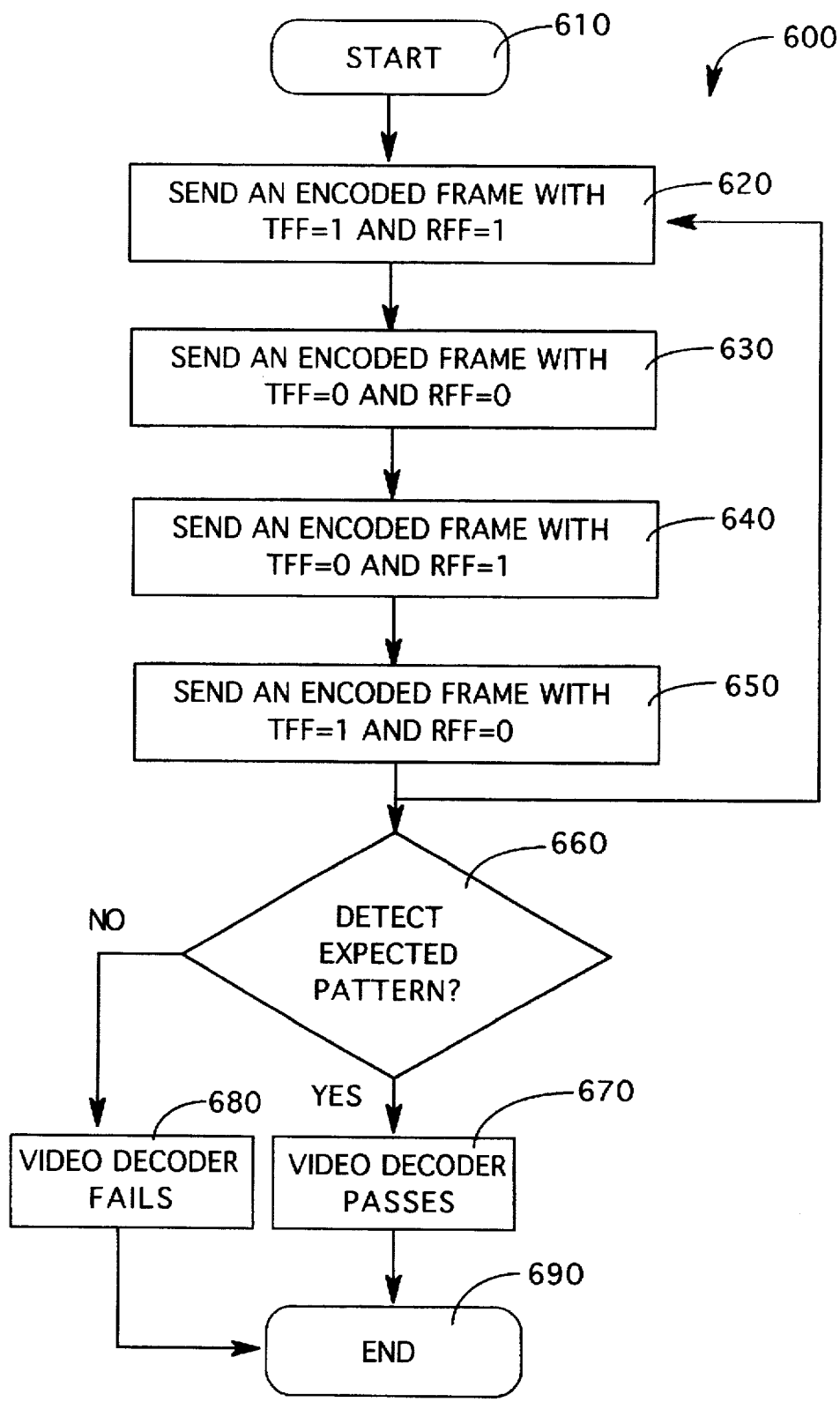
FIG. 6 illustrates a flowchart of a field display test method for a video decoder.

FIG. 6 illustrates a field display test method 600 for a video decoder as implemented by test apparatus of FIG. 3. Method 600 verifies the video decoder's ability to correctly decode and apply the "repeat_first_field" and "top_field_first" flags stored within the encoded video bitstream.

Referring to FIG. 6, the method 600 begins at step 610 and proceeds to step 620 where an encoded frame of an image is sent to the video decoder. The image comprises a plurality of lines where the lines have different colors such as black versus white or color versus no color. The color of the lines are selected such that when the image is generated by the video decoder, two separate regions are identified, i.e., top/bottom regions or left/right regions. The regions should be displayed by the video decoder in accordance to the values assigned to the flags tff and rff.

In step 620, the frame is sent with tff having the value "1" and rff having the value "1". The video decoder should display the frame in three fields where the top field is the first field. The top field is displayed first which is followed by the bottom field. Finally, the top field is displayed again. Thus, the display order is top field, bottom field and top field.

In step 630, another encoded frame is sent to the video decoder. Unlike step 620, the lines of the encoded image contain uniform color or shading, i.e., the lines are all white or contain no color. The frame is sent with tff having the value "0" and rff having the value "0". The video decoder should display the frame in two fields where the bottom field is the first field. The bottom field is displayed first which is followed by the top field. Thus, the display order is bottom field followed by top field.

In step 640, the same image of step 620 is sent to the video decoder. However, tff is set at the value "0" and rff is set at the value "1". The video decoder should display the frame in three fields where the bottom field is the first field. The bottom field is displayed first which is followed by the top field. Finally, the bottom field is displayed again. Thus, the display order is bottom field, top field and bottom field.

In step 650, the same image of step 630 is sent to the video decoder. However, tff is set at the value "1" and rff is set at the value "0". The video decoder should display the frame in two fields where the top field is the first field. The top field is displayed first which is followed by the bottom field. Thus, the display order is top field followed by bottom field.

The steps 620 through 650 are repeated for a predefined number of cycles, e.g., 120 coded frames, to permit an evaluation tool to evaluate the video output of the decoder in step 660. Thus, 120 coded frames should be displayed in 150 video frame times or in five seconds. The order of steps 620 through 650 and the associated combinations of tff and rff values are not limited to the order disclosed in FIG. 6. Different order of steps 620 through 650 with different combinations of tff and rff values may produce the same desired result.

In step 660, method 600 determines whether the video decoder has correctly decoded the encoded bitstream and applied the correct display parameters by detecting for the desired visual pattern. In the preferred embodiment, the encoded images are selected such that the video output produces two distinct regions with a desired visual pattern. These regions are easily detected by visual inspection. If the decision is affirmatively answered, method 600 proceeds to step 670 where the video decoder is deemed to have passed the test. If the decision is negatively answered, method 600 proceeds to step 680 where the video decoder is deemed to have failed the test. When the performance of the video decoder is determined, method 600 ends in step 690.

Method 600 provides an effective test of a black box video decoder's ability to decode and apply the correct "repeat_first_field" and "top_field_first" flags. The correct decoding of these flags is important in the implementation of the 3:2 pulldown feature. If the video decoder fails this test, the video output will generate an unexpected pattern such as a uniform image without distinct regions or the brightness of the regions are reversed from the correct display.

Figure 7:
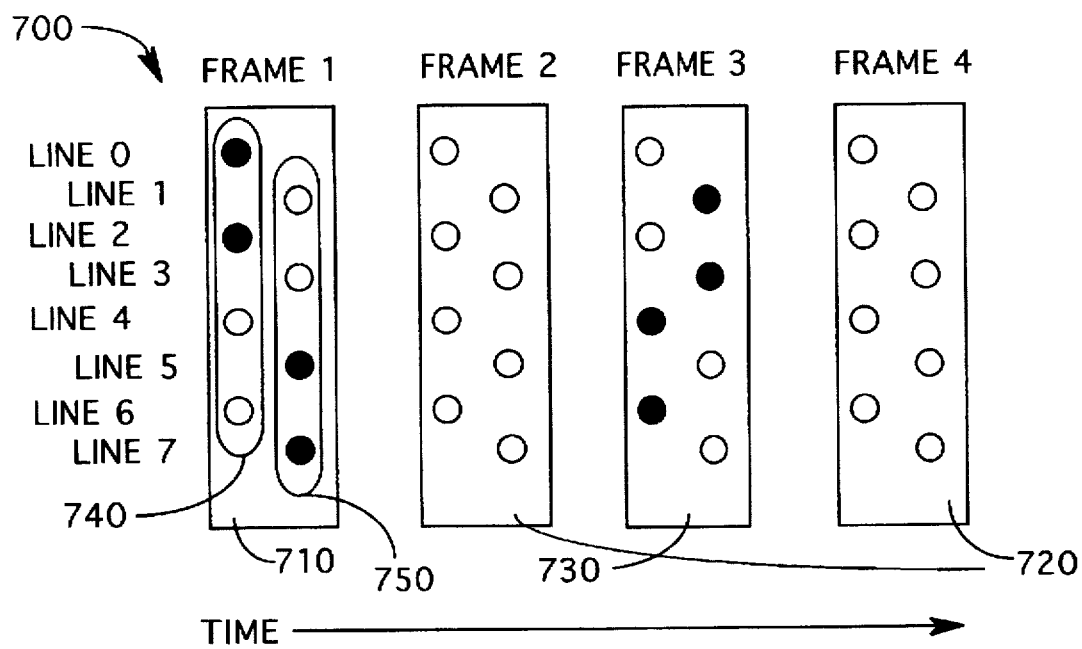
FIG. 7 illustrates a sequence of images for producing an output image having a distinct upper region and a lower region in accordance with the method of FIG. 6.

FIG. 7 illustrates a sequence of images 700 in the form of frames 1 through 4 where such sequence, if encoded and applied to method 600 disclosed above, will produce an output image (shown in FIG. 8) having a distinct upper region and a lower region. In one embodiment, the lines shown as "open" circles are represented by some background color such as black, while lines shown as "filled" circles are represented by some foreground color such as white.

In frame 1 (710), the upper portion of the top field 740 is provided with a foreground color, while the lower portion of the bottom field 750 is also provided with a foreground color. Frames 2 and 4 (720) are provided with a background color for both top and bottom fields. Finally, frame 3 (730) is the exact opposite of frame 1, where the upper portion of the top field is provided with a background color, while the lower portion of the bottom field is also provided with a background color. If frames 1 through 4 of FIG. 7 are encoded in accordance with steps 620 through 650 of method 600, the output image will produce an upper region that is twice as bright as a lower region. This output image is used as a desired output image pattern for evaluating the performance of a video decoder.

However, those skilled in the art will realize that the sequence illustrated in FIG. 7 can be modified in many ways to produce a desired pattern when applied to method 600. For example, the sequence of FIG. 7 can be modified such that the top field of frame 1 contains a bright "left" portion and a dark "right" portion, while the bottom field of frame 1 contains a dark "left" portion and a bright "right" portion. Frame 3 will be modified such that the top field of frame 3 contains a dark "left" portion and a bright "right" portion, while the bottom field of frame 3 contains a bright "left" portion and a dark "right" portion. This modified sequence will produce a left region that is twice as bright as a right region if it is correctly decoded by the video decoder. Furthermore, frames 2 and 4 can be modified to include a color other than the background. The color may be the foreground or an intermediate value.

Figure 8:
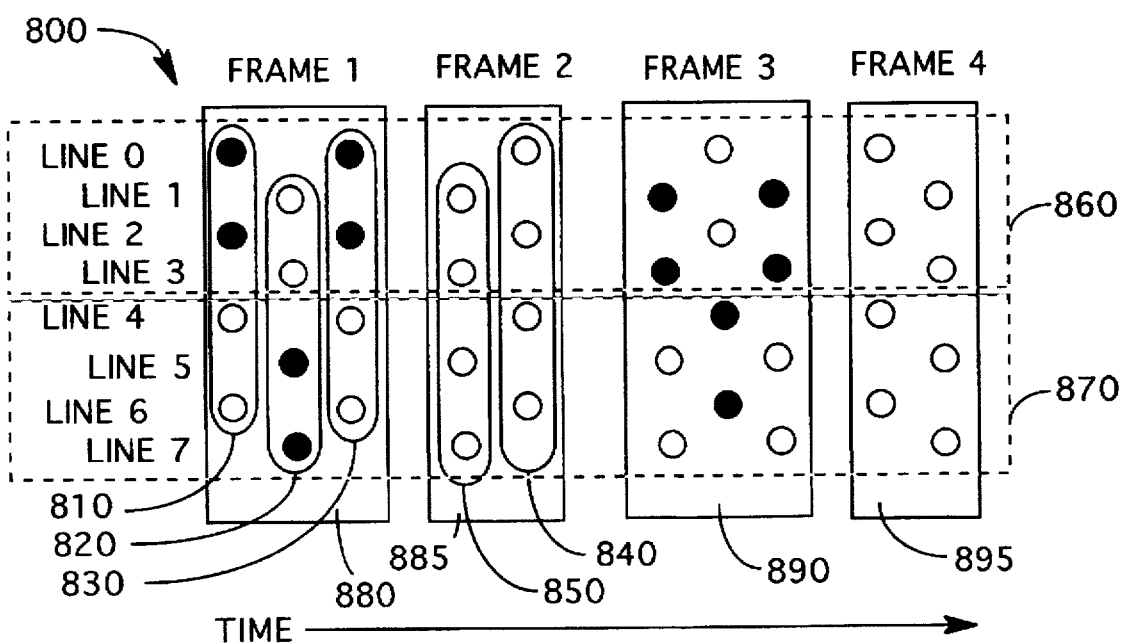
FIG. 8 illustrates an output video sequence produced by the method of FIG. 6.

FIG. 8 illustrates an output video sequence 800 of the method 600 where the sequence of images of FIG. 7 is used as the encoded frames. FIG. 8 shows a video sequence which consists of two regions, an upper region 860 comprising lines 0–3 and a lower region 870 comprising lines 4–7.

In accordance with step 620 of FIG. 6, frame 1 (880) is displayed with three fields 810, 820 and 830 where the top field 810 is repeated as field 830. Thus, the upper portion contains twice as much foreground color ("on") as the lower portion.

In accordance with step 630, frame 2 (885) is displayed with two fields, where the bottom field 850 is displayed first and the top field 840 is displayed second. In essence, the bottom field is designated as the first field. Since both top and bottom fields contain background color ("off"), the brightness of both upper and lower regions should be equal.

In accordance with step 640, frame 3 (890) is displayed with three fields, where the bottom field is repeated. Again, the bottom field is designated as the first field. Thus, the upper portion again contains twice as much foreground color as the lower portion.

In accordance with step 650, frame 4 (895) is displayed with two fields, where the top field is displayed first and the bottom field is displayed second. Since both top and bottom fields contain background color, the brightness of both upper and lower regions should be equal.

As the sequence is repeated, both regions will flash "on" and "off". Since the upper region 860 is "on" for two of every five fields and the lower region 870 is only "on" for one of every five fields, the upper region should appear twice as bright as the lower region. If the decoder interprets the tff flag backward, then lines 5 and 7 of frame 1 (880) will be repeated (and so forth). The resulting image will produce a lower region that is brighter than the upper region, which provides a easily detectable visual sign for indicating an error in the video decoder. Similarly, if the rff flag value is not implemented such that the first fields of frame 1 and 3 are not repeated, then the resulting image will produce a lower region and an upper region of equal brightness, which again indicates an error in the video decoder.

Figure 9:
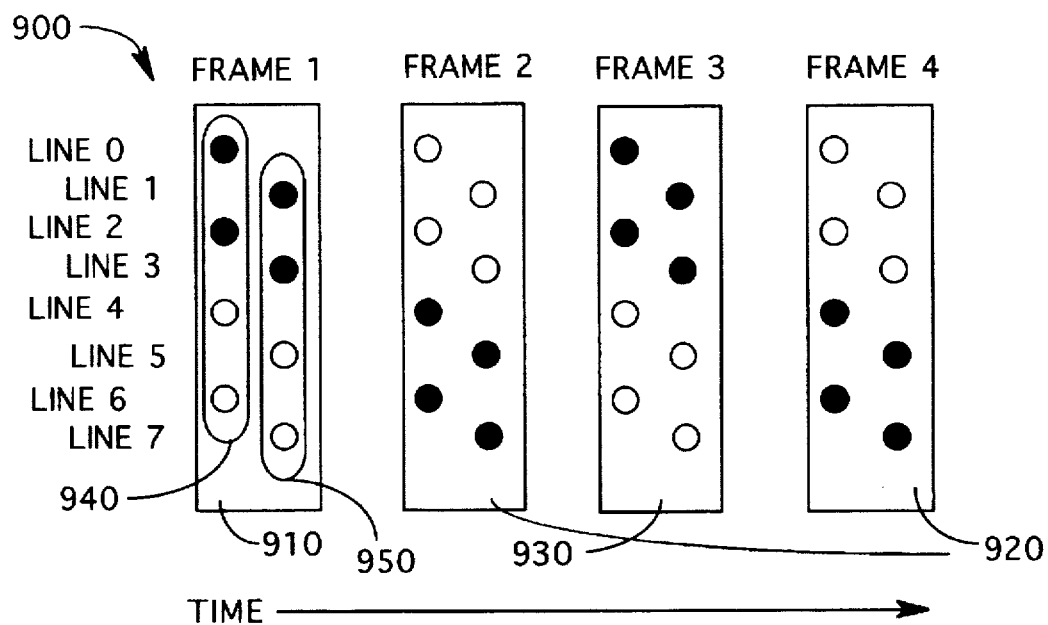
FIG. 9 illustrates a second sequence of images for producing an output image having a distinct upper region and a lower region in accordance with the method of FIG. 6.

FIG. 9 illustrates a second sequence of images 900 in the form of frames 1 through 4 where such sequence, if encoded and applied to method 600 disclosed above, will produce an output image (shown in FIG. 10) having a distinct upper region and a lower region.

In frames 1 and 3 (910 and 930), the upper portions of the top field 940 and bottom field 950 are provided with a foreground color, while the lower portions of these fields are provided with a background color. In contrast, frames 2 and 4 (720) are provided with a background color for the upper portions of the top field and the bottom field, while the lower portions of these fields are provided with a foreground color. If frames 1 through 4 of FIG. 9 are encoded in accordance with steps 620 through 650 of method 600, the output image will produce an upper region that is brighter than the lower region. This output image is used as a desired output image pattern for evaluating the video decoder's ability to decode and implement the rff flag.

Again, those skilled in the art will realize that the sequence illustrated in FIG. 9 can be modified in many ways to produce a desired pattern when applied to method 600. For example, the sequence of FIG. 9 can be modified such that the top and bottom fields of frame 1 and 3 contain a bright "left" portion and a dark "right" portion. Frames 2 and 4 will be modified such that the top and bottom fields of frame 1 and 3 contain a dark "left" portion and a bright "right" portion. This modified sequence will produce a left region that is brighter than the right region if it is correctly decoded by the video decoder.

Figure 10:
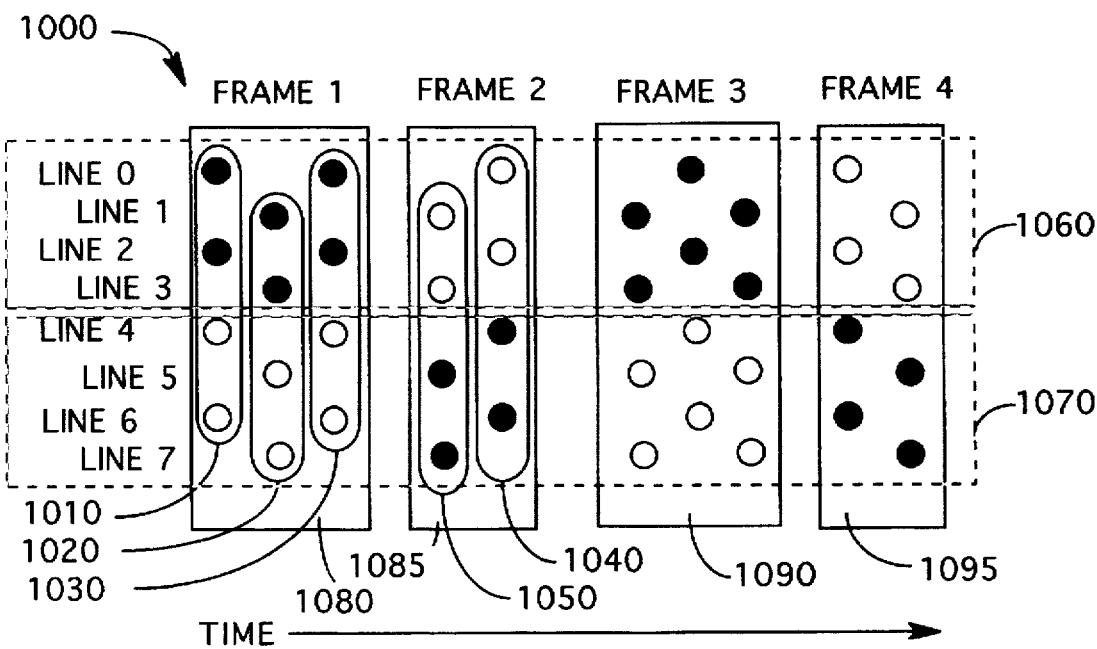
FIG. 10 illustrates a second output video sequence produced by the method of FIG. 6.

FIG. 10 illustrates an output video sequence 1000 of the method 600 where the sequence of images of FIG. 9 is used as the encoded frames. FIG. 10 shows a video sequence which consists of two regions, an upper region 1060 and a lower region 1070.

In accordance with step 620 of FIG. 6, frame 1 (1080) is displayed with three fields 1010, 1020 and 1030 where the top field 1010 is repeated as field 1030. Thus, the upper portion 1060 is "on" for all three fields.

In accordance with step 630, frame 2 (1085) is displayed with two fields, where the bottom field 1050 is displayed first and the top field 1040 is displayed second. Thus, the upper portion 1060 is "off" for both fields.

In accordance with step 640, frame 3 (1090) is displayed with three fields, where the bottom field is repeated. Again, the upper portion 1060 is "on" for all three fields.

In accordance with step 650, frame 4 (1095) is displayed with two fields, where the top field is displayed first and the bottom field is displayed second. Again, the upper portion 1060 is "off" for both fields.

As the sequence is repeated, both regions will flash "on" and "off". Since the upper region 1060 is "on" for three of every five fields and the lower region 1070 is "on" for two of every five fields, the upper region should appear brighter than the lower region. If the rff flag is misinterpreted such that the fields in frames 1 and 3 are not repeated, then the output image will have an upper and lower regions of equal brightness. Alternatively, if the rff flag is misinterpreted such that the fields in frames 2 and 4 are repeated, then the output image will produce a brighter lower region instead, which provides a easily detectable visual sign for indicating an error in the video decoder. Since a misinterpretation of the tff flag will not affect the result in this case, the sequence 900 of FIG. 9 provides a fast and effective verification on the operation of the rff flag.

Figure 11:
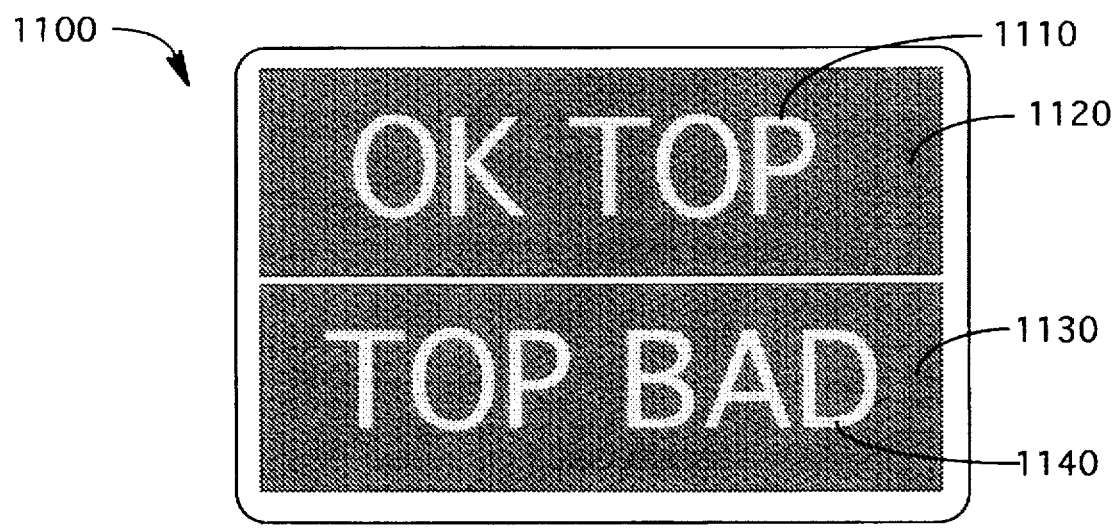
FIG. 11 illustrates a video output image with displayed messages.

The output image can be further refined such that the regions of differing brightness are replaced by a set of displayed messages on a video monitor. FIG. 11 illustrates an output image 1100 where the brightness of the upper 1120 and lower 1130 regions are replaced by displayed messages 1110 and 1140. Each region comprises an active portion (the lettering) and one static portion (the gray area behind the letters). The gray color is uniformly applied to all lines in the region. In the preferred embodiment, the active region is composed of a 0 IRE background ("off") with a 100 IRE foreground ("on"). IRE are units of video brightness and those skilled in the art will realize that other IRE values can be selected to produce similar effect. For example, the range of 80 IRE and 20 IRE for "on" and "off" may be preferred over the saturating values of 0 and 100 IRE.

The active portion in the upper region corresponds to the upper region 860 of FIG. 8. Since the active region is "on" for two of five fields, it will have an average brightness of 40 IRE. The active portion in the bottom region corresponds to the lower region 870 of FIG. 8. Since the active region is "on" for one of five fields, it will have an average brightness of 20 IRE. The gray inactive portion is 20 IRE gray. Thus, if the video decoder implements the tff flag correctly, the "OK TOP" message 1110 will appear as light lettering on a darker gray background. In contrast, the active portion in the lower region will not have much contrast relative to the gray inactive portion. If the decoder misinterpret the tff flag, the "TOP BAD" message 1140 will appear instead as discussed above.

Figure 12:
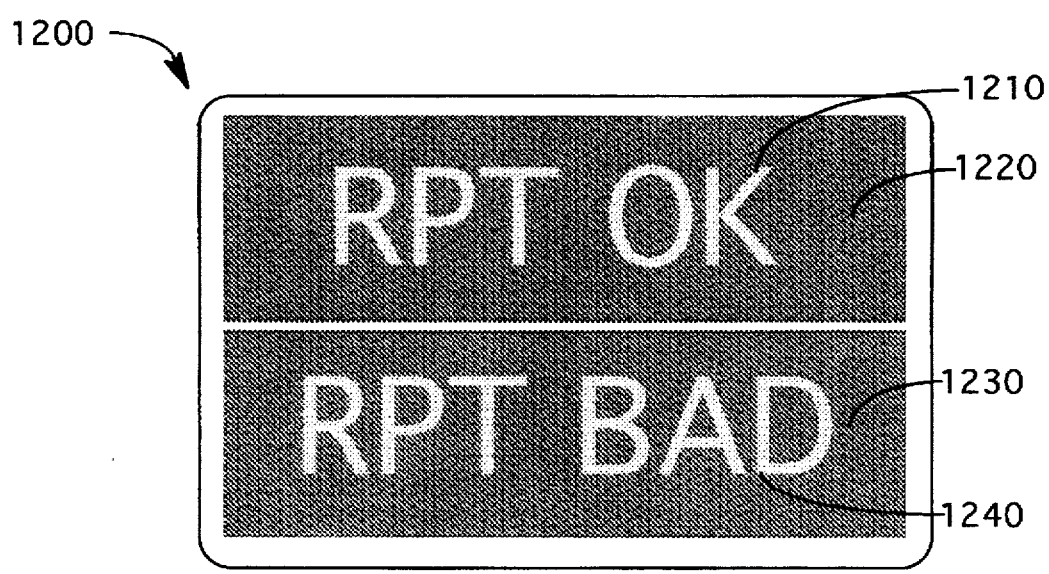
FIG. 12 illustrates a second video output image with displayed messages.

FIG. 12 illustrates an output image 1200 where the brightness of the upper 1220 and lower 1230 regions are replaced by displayed messages 1210 and 1240. The active portion in the upper region corresponds to the upper region 1060 of FIG. 10. Since the active region is "on" for three of five fields, it will have an average brightness of 60 IRE. The active portion in the bottom region corresponds to the lower region 1070 of FIG. 10. Since the active region is "on" for two of five fields, it will have an average brightness of 40 IRE. The gray inactive portion is 40 IRE gray. Thus, if the video decoder implements the rff flag correctly, the "RPT OK" message 1210 will appear as light lettering on a darker gray background. In contrast, the active portion in the lower region will not have much contrast relative to the gray inactive portion. If the decoder misinterpret the rff flag, the "RPT BAD" message 1240 will appear instead as discussed above. Furthermore, a reference box (not shown) comprising a 40 IRE gray lettering on a 20 IRE background or a 60 IRE gray lettering on a 40 IRE background can be included on the display as a reference.

However, those skilled in the art will realize that the output images 1100 and 1200 can be modified in many ways to produce similar desired patterns. For example, the background of the upper and lower regions could consist of a static, but undulating gray pattern with 40 IRE average level, or it could be a time-varying level which resembles "noise" with a 40 IRE average level. Alternatively, the messages in the upper and lower regions could appear as static text outside the region with a geometric "lighted" shape in the regions serving as the indicator. Another alternative is to divide each region into two parts, a gray part and an active part.

The consequence of using an encoding technique that relies upon variable length coding is that the overall data rate is variable. This condition requires the encoder to control the bitrate to avoid underflow or overflow conditions. The MPEG standards specify an abstract model of the buffering system, the Video Buffer Verifier (VBV) in order to constrain the maximum variability in the number of bits that are used for a given picture. The VBV is a hypothetical decoder which is initially empty and is conceptually connected to the output of the encoder. The VBV has an input buffer known as VBV buffer which is filled from the encoded bitstream for the time specified by the parameter or field "vbv_delay" in the video bitstream. This ensures that an encoded bitstream can be decoded with a buffer of known size.

In the MPEG-2 standard, the time interval between removing one frame and the next frame can be arbitrarily defined equal to T. 2T or 3T, where T is the field period. Specifically, the MPEG-2 standard states that if the n'th picture is a frame_structure P or I frame and if the previous coded P or I frame has rff=0, then the time when the n'th coded picture is removed from the VBV buffer is 2T. Additionally, if the n'th picture is a frame_structure P or I frame and if the previous coded P or I frame has rff=1, then the time when the n'th coded picture is removed from the VBV buffer is 3T. These conditions require special treatment within the implementation of the above test method illustrated in FIG. 6.

Figure 13:
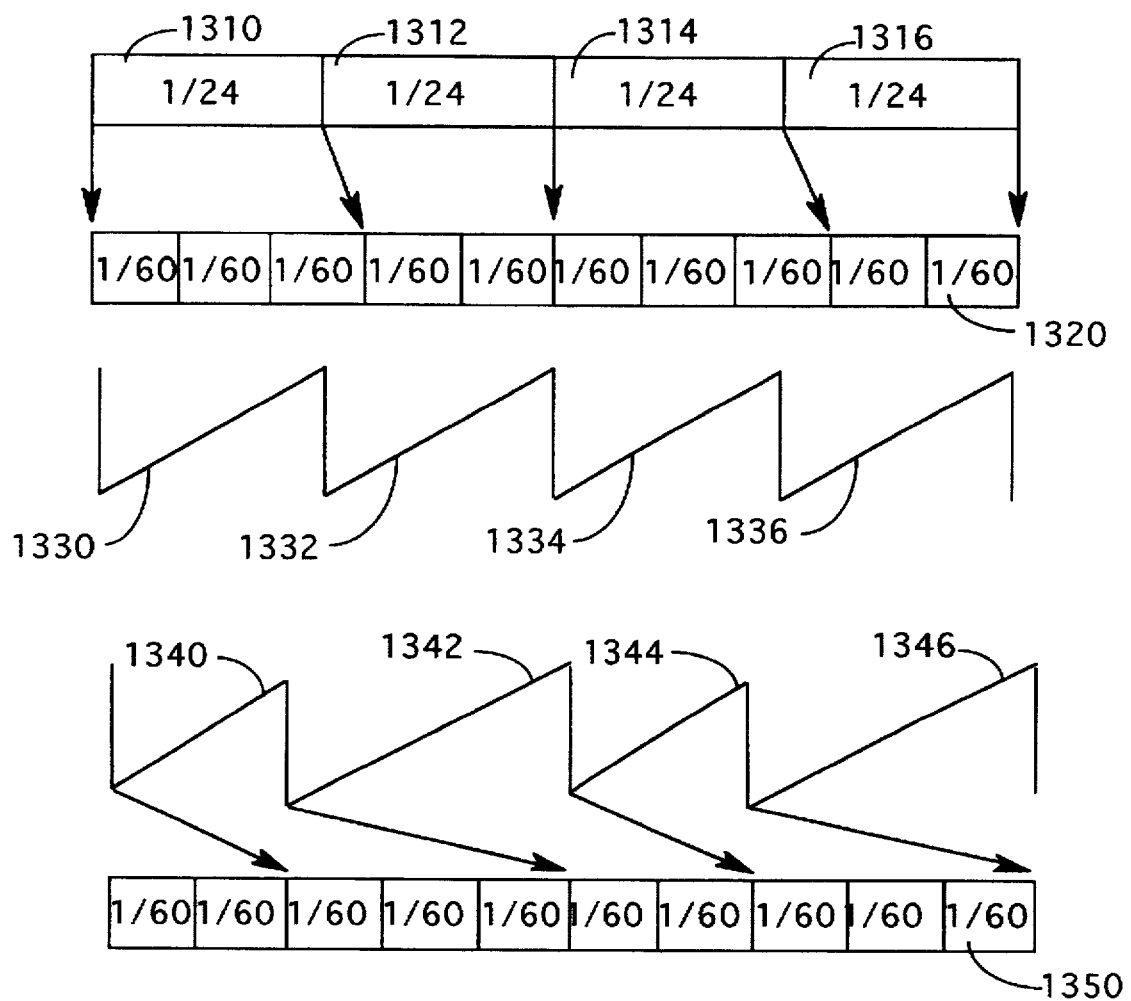
FIG. 13 illustrates a timing diagram of a VBV in relation to the coded picture rate and the display field rate.

FIG. 13 illustrates a timing diagram of a VBV in relation to the coded picture or frame rate and the display field rate. The coded picture rate is approximately set at 24 fps as illustrated in frame 1 through frame 4 (1310–1316). These coded frames will be displayed at the field period 1320 of approximately 60 fields per second. Under the VBV model for the 24 fps video decoder, the corresponding vbv_delay values for frame 1 through frame 4 are illustrated as 1330 through 1336 respectively.

However, since test method 600 repeats steps 620 through 650 with frame 1 encoded with rff=1 and frame 4 encoded with rff=0, the actual "vbv_delay*" values at the video decoder is illustrated as 1340 through 1346 respectively. This result correlates with the conditions specified by the MPEG-2 standard.

To illustrate, since frame 1 (rff=1) is repeated after frame 4 (rff=0) as described in FIG. 6, the MPEG-2 standard specifies the time when frame 1 is removed from the VBV buffer as 2T (1340). Since the time period 1340 is less than 1330, the video decoder will attempt to remove frame 1 (1310) from the VBV buffer before the entire frame is received by the VBV buffer. In order to avoid this discrepancy, the vbv_delay values are adjusted after the encoding of the frames as follows:

$$vbv\_delay\_1^* = vbv\_delay\_1 \quad (1)$$

$$vbv\_delay\_2^* = vbv\_delay\_2 - 1/120 \text{ sec.} \quad (2)$$

$$vbv\_delay\_3^* = vbv\_delay\_3 \quad (3)$$

$$vbv\_delay\_4^* = vbv\_delay\_4 - 1/120 \text{ sec.} \quad (4)$$

where vbv_delay_1* through vbv_delay_4* correlate to the vbv-delay values encoded in the test bitstream for frames 1 through 4 respectively. However, those skilled in the art will realize that the adjustments in the vbv_delay values can be modified by adding a value or subtracting a value. Thus, it is possible to add an initial arbitrary value to all the vbv_delay values and then apply a subtraction operation.

There has thus been shown and described a novel method and apparatus for creating a bitstream that will produce visually detectable errors in the video output produced by a video decoder if the decoder does not properly decode the bitstream. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. A method of evaluating a video decoder, comprising the steps of:

(a) sending an encoded video bitstream having a display parameter to the video decoder;

(b) decoding said encoded video bitstream by the video decoder; and (c) observing a visual sign corresponding to said encoded video bitstream in accordance with said display parameter to evaluate a field display functionality of the video decoder.

2. The method of claim 1, wherein said bitstream comprises a plurality of frames which are encoded with a top_field_first value and a repeat_first_field value, where said top_field_first value or said repeat_first_field value is altered for at least one of said frames, wherein said display parameter comprises said top_field_first value and said repeat_first_field value.

3. The method of claim 2, wherein said plurality of frames includes a set of frames comprising:

a first frame encoded with a top_field_first value of "1" and a repeat_first_field value of "1";

a second frame encoded with a top_field_first value of "0" and a repeat_first_field value of "0";

a third frame encoded with a top_field_first value of "0" and a repeat_first_field value of "1"; and a fourth frame encoded with a top_field_first value of "1" and a repeat_first_field value of "0".

4. The method of claim 3, wherein said set of frames is repeated in said bitstream for a predefined number of cycles.

5. The method of claim 3, wherein said first frame has two fields, where each of said fields contains two regions with different brightness values, said second and fourth frames have two fields, where each of said fields contains similar brightness values throughout the entire field and said third frame has two fields, where each of said fields contains two regions with different brightness values opposite to that of said first frame.

6. The method of claim 3, wherein each of said first and third frames has two fields, where each of said fields contains two regions with different brightness values and each of said second and fourth frames have two fields, where each of said fields contains two regions with different brightness values opposite to that of said first and third frames.

7. The method of claim 2, wherein said visual sign comprises two distinct regions displayed in a desired pattern if the video decoder correctly decodes the encoded video bitstream.

8. The method of claim 7, wherein said desired pattern comprises said regions with differing brightness.

9. The method of claim 8, wherein said desired pattern further comprises a brighter upper region.

10. The method of claim 7, wherein said desired pattern comprises said regions having differing colors.

11. The method of claim 7, wherein said desired pattern comprises said regions having displayed indicators.

12. The method of claim 7, wherein said desired pattern comprises said regions having displayed messages.

13. The method of forming a test bitstream for evaluating a video decoder, comprising the steps of:

encoding an input sequence of selected frames which are encoded with a top_field_first value and a repeat_first_field value into the test bitstream for evaluating a field display functionality of the video decoder; and selecting a vbv_delay value for each of said selected frame in accordance with the repeat_first_field value encoded for said selected frame, where said vbv_delay value for each of said selected frames is adjusted to equal a frame rate of said input sequence if the repeat_first_field value of an immediate previous frame is "0"

and equal to a frame rate of said input sequence minus a quotient of one over twice of a selected displayed field rate, if the repeat_first_field value of an immediate previous frame is "1".

14. The method of claim 13, wherein said top_field_first value or said repeat_first_field value is altered for at least one of said selected frames.

15. The method of claim 13, wherein said selected frames include:
- a first frame encoded with a top_field_first value of "1" and a repeat_first_field value of "1";
- a second frame encoded with a top_field_first value of "0" and a repeat_first_field value of "0";
- a third frame encoded with a top_field_first value of "0" and a repeat_first_field value of "1"; and
- a fourth frame encoded with a top_field_first value of "1".

16. The method of claim 13, wherein said selected frames contain lines with varying brightness where a decoded output of said selected frames comprises two distinct regions with differing brightness.

17. A bitstream for testing a video decoder comprising:
- a first frame encoded with a top_field_first value of "1" and a repeat_first_field value of "1";
- a second frame encoded with a top_field_first value of "0" and a repeat_first_field value of "0";
- a third frame encoded with a top_field_first value of "0" and a repeat_first_field value of "1"; and
- a fourth frame encoded with a top_field_first value of "1".

18. The bitstream of claim 17, wherein said first, second, third and fourth frames are repeated in said bitstream for a predefined number of cycles.

19. The bitstream of claim 17, wherein each of said frames include a vbv_delay value selected in accordance with its corresponding repeat_first_field value, where said vbv_delay value for each of said frame is selected to equal a picture rate of said frames, if the repeat_first_field value of an immediate previous frame is "0" and equal to a picture rate of said frames minus a quotient of one over twice of a selected displayed field rate, if the repeat_first_field value of an immediate previous frame is "1".

20. An apparatus for testing a video decoder comprising:
- means for generating an encoded video bitstream having a display parameter;
- means, coupled to said generating means, for sending said encoded video bitstream to the video decoder; and
- means, coupled to the video decoder, for observing a visual sign corresponding to said encoded video bitstream in accordance with said display parameter to evaluate a field display functionality of the video decoder, where said visual sign comprises two distinct regions with a desired pattern.

21. The apparatus of claim 20, wherein said generating means comprises a general purpose computer having a memory for storing said encoded video bitstream.

22. The apparatus of claim 20, wherein said video decoder is a MPEG video decoder.

* * * * *